UNITED STATES PATENT OFFICE 2,689,262

DIETHANOLAMINE SALT OF α,α-DICHLOROPROPIONIC ACID

George W. Scoles, Hemlock, Mich., assignor to The Dow Chemical Company, Midland, Mich., a corporation of Delaware No Drawing. Application April 9, 1953, Serial No. 347,850

1 Claim. (Cl. 260—501)

This invention is concerned with the diethanolamine salt of α,α-dichloropropionic acid having the following formula

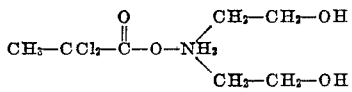

This compound is a liquid material at temperatures as low as 0° F. It has been found to be non-corrosive to iron, somewhat soluble in many organic solvents and of very high water solubility. The novel compound has been tested and found active as a herbicide, and is adapted to be employed in spray and dust compositions for the control of the growth and the killing of weeds and for the sterilization of soil with regard to plant growth.

The new compound may be prepared by reacting α,α-dichloropropionic acid with diethanolamine. In carrying out the reaction, the reactants may be added portionwise one to the other with stirring. In an alternative method, the reagents may be contacted in an organic solvent such as benzene. The amounts of the reactants employed are such that the pH of the ultimate mixture is about 7. Good results are obtained when operating at temperatures of from about 80° to 212° F. and when employing substantially equimolecular proportions of the reactants. The reaction is somewhat exothermic, the temperature being controlled by regulation of the rate of contacting the reactants and by the addition and subtraction of heat, if required.

In a preferred method of operation, one molecular proportion of diethanolamine is added portionwise to one molecular proportion of α,α-dichloropropionic acid or to a solvent dispersion of the same proportion of said acid. The addition is generally carried out with stirring and cooling and at a temperature of from about 80° to 212° F. An additional amount of α,α-dichloropropionic acid or diethanolamine, depending upon the pH of the mixture, is then added portionwise to the reaction zone until the pH of the ultimate mixture is about 7. Following the reaction, the solvent, if employed, may be recovered by distillation. The solvent free reaction mixture constitutes the desired product in substantially pure form.

In a representative operation, 567 grams (5.4 moles) of diethanolamine was added portionwise to 715 grams (5.1 moles) of α,α-dichloropropionic acid. The addition was carried out with stirring and cooling and over a period of about one hour. During the addition the temperature of the reaction mixture rose to about 150° F. Following the addition, the pH of the reaction mixture was found to be 7.0. At the conclusion of the reaction, the product was cooled to room temperature and removed from the reactor. This product, the diethanolamine salt of α,α-dichloropropionic acid had a refractive index $n_D$ of 1.5043 at 25° F.

In an additional operation, 71.5 grams (0.5 mole) of α,α-dichloropropionic acid was dispersed in 50 grams of benzene and 53 grams (0.504 mole) of diethanolamine added portionwise thereto with stirring and cooling. The reaction vessel and contents were then cooled to room temperature, the reaction mixture separating into a benzene layer and a viscous product layer. The latter was separated and heated for a short period of time to evaporate off any remaining benzene. This solvent-freed product, the diethanolamine salt of α,α-dichloropropionic acid, had a refractive index $n_D$ of 1.5043 at 25° F.

The water-soluble salts of α,α-dichloropropionic acid are particularly valuable as active constituents of plant growth control compositions and for the killing of vegetation. Such compositions are generally made up as water solutions of the active ingredients. If the active ingredient is a crystalline solid at ordinary temperatures, the preparation of aqueous solutions generally requires the actual weighing out of the desired amount of active ingredient.

The commonly known salts of α,α-dichloropropionic acid are crystalline solids at ordinary temperatures and present obvious difficulties in preparing and formulating aqueous spray compositions for practical field applications.

The diethanolamine salt of the present invention is a viscous liquid at temperatures as low as 0° F. Thus, a desired liquid measure portion of this salt, i. e. a quart, liter or fraction thereof, may be poured into the spray tank to obtain the desired aqueous spray solution. The desirable liquid characteristic of this salt makes possible the preparation of aqueous spray compositions containing the valuable α,α-dichloropropionate type herbicide, without the actual weighing step generally required with the commonly known salts.

I claim:

The diethanolamine salt of α,α-dichloropropionic acid.

No references cited.